Jan. 15, 1946. H. V. REED 2,392,947
CENTRIFUGAL CLUTCH
Filed July 22, 1944
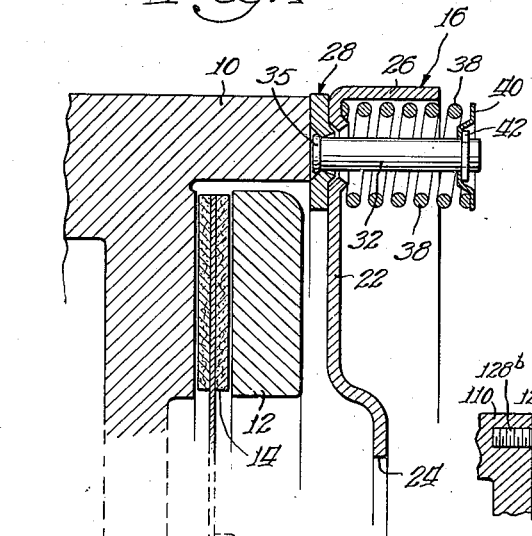
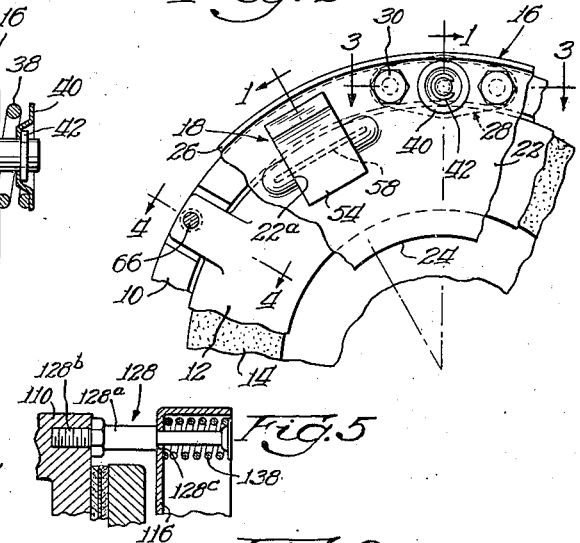
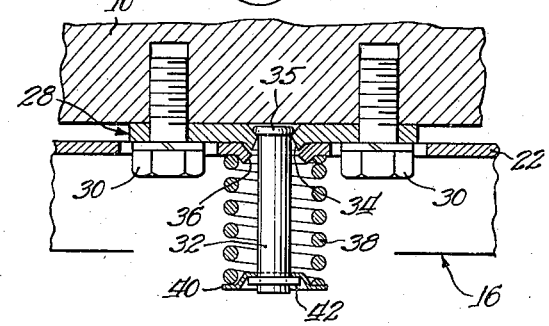
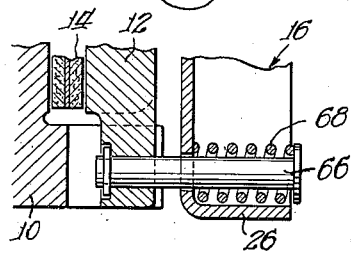
Inventor
Harold V. Reed
By: Edward C. Gutbrun
Atty.

Patented Jan. 15, 1946

2,392,947

UNITED STATES PATENT OFFICE 2,392,947

CENTRIFUGAL CLUTCH

Harold V. Reed, Chicago, Ill., assignor to Borg-Warner Corporation, Chicago 4, Ill., a corporation of Illinois Application July 22, 1944, Serial No. 546,123

5 Claims. (Cl. 192—105)

This invention relates to clutches and particularly to a centrifugally operated friction disc type of clutch.

It is an object of this invention to provide a simplified centrifugal clutch assembly eliminating the usual cover plate and manual control mechanism and reducing the cost of manufacture and maintenance generally.

It is a more particular object to provide in a clutch of the above type an improved main operating spring carrier plate or ring and means for attaching the same to the flywheel through the medium of the springs providing for relative movement between the flywheel and the spring carrier in response to the operation of the centrifugal weights upon rotation at a selected speed.

It is a still further object to provide in a clutch of the above type an improved relationship between the pressure plate, centrifugal weights, spring carrier and flywheel whereby to increase the simplicity and efficiency of operation as well as to reduce the cost of manufacture and maintenance.

The above and other objects, advantages and uses of my invention will become apparent from a reading of the following specification taken in connection with the accompanying drawing which forms a part thereof and wherein:

Fig. 1 is an axial cross-sectional view taken substantially on line 1—1 of Fig. 2 showing a centrifugal clutch assembly incorporating a preferred embodiment of my invention;

Fig. 2 is a broken away sectional view of the upper right-hand portion of Fig. 1;

Fig. 3 is a cross-sectional view taken substantially on line 3—3 of Fig. 2;

Fig. 4 is a broken away axial sectional view showing to advantage the driving relation between the flywheel and pressure plate; and Fig. 5 is a sectional view similar to Fig. 1 showing a modified form of fastening and attaching means.

The centrifugally operable friction clutch assembly disclosed by way of preferred example in Figures 1 through 4 includes a driving flywheel or back plate 10, a pressure plate 12, a friction disc 14 interposed therebetween, a main operating spring carrier plate or ring assembly indicated generally at 16 and a plurality of centrifugally responsive assemblies indicated generally at 18 for moving said pressure plate into engagement with said friction disc and compressing the main operating springs.

It is to the particular arrangement comprising the main spring carrier plate or ring 16, supporting driving member or flywheel 10 and the centrifugally responsive operating assemblies 18 that the present invention is directed.

The operating or reaction spring carrier plate 16 comprises an annular ring-like pressed or drawn sheet metal plate member including a radially extending wall 22 formed with a central opening 24 and terminating in an axially outwardly extending peripheral wall 26 corresponding in radial position to the position of the periphery of the flywheel 10. Three circumferentially and symmetrically spaced attaching members 28 have the dual function of cooperating with other elements of the clutch proper to produce an arrangement capable of ready assembly into one unit for shipment and additionally serving as ready attaching means for subsequently mounting the unit on a flywheel. In the preferred embodiment these attaching members 28 take the form of small sheet metal stampings adapted to be readily fastened to the flywheel adjacent the periphery thereof by means of bolts 30 and supporting upstanding guide pins 32 passing through countersunk openings 34 in the stampings, the flanges 35 functioning to fasten the bolts in position. The wall 22 of the spring carrier ring is formed with complementary openings 36 for embracing and guided reception about the guide pins 32. Main reaction springs 38 are received about guide pins 32 with the inner terminals thereof in engagement with the ring carrier wall 22 about openings 36.

The outer terminals of the springs 38 are engaged by cap members 40 confined on guide pins 32 by snap rings 42. This arrangement functions to urge the spring carrier ring in the direction of the flywheel 10 and into engagement with the stampings 28 when the assembly is stationary.

Three symmetrically spaced fastening and attaching members 28 are disclosed in the preferred embodiment, however, it will be apparent that a larger number may be employed depending upon the requirements of the particular installation. It will also appear that while I prefer a plurality of these simple stamped elements as the fastening and attaching members 28, I also contemplate as coming within the broad scope of my invention the use of a single annular ring or other equivalent. As will further appear from the disclosure of the alternative embodiment hereinafter described, the important thing is the provision of a simple unifying means functioning to both fasten the reaction member and reaction springs to form a unitary assembly and at the same time provide means for readily attaching the unit to the driving member of flywheel. Also, while I have shown a plurality of coil compression springs 38 as forming the preferred embodiment of the required reaction means it will be understood that other forms of spring means may be employed such as, for example, the commonly available Bellville type of spring (not shown).

Centrifugally responsive assemblies indicated generally at 18 are disposed symmetrically about the periphery for moving the pressure plate 12 away from the spring carrier 16 and loading the main operating springs 38, three of these centrifugal assemblies 18 being preferred as shown. Formed on the back of pressure plate 12 is a fulcrum portion 44 having on one side thereof a recessed slot 46 and on the other side thereof an axially extending protuberance 44a functioning as an intermediate stop as will be seen.

Each of the centrifugally responsive assemblies includes a lever 48 having a fulcrum engaging portion 50, a weight 54 carried on the work applying terminal of lever 48 and a work performing toe portion 56 engageable on the underside thereof with slot 46. On the opposite side of work applying toe portion 56 the lever is formed with a slot for pivotal engagement with one terminal of a compression plate or link 58, the opposite terminal of which link is received in pivotal engagement with a stamped recessed portion in radially extending wall 22 of spring carrier 16. Wall 22 is formed with a generally rectangular opening 22a therethrough in order that the weight 54 may be positioned on the outside of the carrier ring 16 while the work lever 48 passes therethrough.

The pressure plate 12 is drivingly connected with the flywheel 10 through the usual slots 62 in the flywheel and radial tongues 64 on the pressure plate. The pressure plate is provided with an arrangement for applying a retracting force thereto including retractor springs 68 and guide pins 66 passing through the radial tongues 64 and the spring carrier wall 22.

From the above it will be seen that upon rotation of the clutch at a predetermined speed the several weight members 54 will be thrown radially outwardly by centrifugal force applying a force to lever 52 about the fulcrum 44 to place link 58 in compression. The fulcrum 44 will be shifted axially in the direction of the flywheel 10 to move the pressure plate into engagement with the friction disc 14. The spring carrier ring 16 will be moved away from the pressure plate and separated from contact with the stampings 28 on the flywheel 10 to thus load the main reaction springs 38. The outward radial movement of the weighted members 54 is limited by the same engaging the wall 26 of carrier 16. Upon the speed of rotation being reduced the springs 38 will function to again move the spring carrier ring 16 in the direction of the pressure plate turning lever 52 about fulcrum 44 moving the weighted members 54 radially inwardly and bringing the underside of the toe 56 back into engagement with the slot 46 in the pressure plate 12, the retractor springs 66 functioning to withdraw the pressure plate 12 away from pressure engagement with the disc 14.

Referring now to Fig. 5 there is shown an alternative arrangement of fastening and attaching member 128 in the form of a stud 128a threaded at 128b for attaching the same to the flywheel 110. Stud 128a has a shoulder 128c for supporting the carrier 116 in a manner similar to that disclosed in connection with Fig. 1. Springs 138 serve the same function as springs 38 in the modification of Fig. 1.

It will thus appear from the above alternative modifications that I have provided a simple arrangement eliminating the usual cover plate and substituting therefor an arrangement which is effective to fasten the essential clutch elements in one unitary assembly for ready shipment as well as providing the necessary attaching means for quick installation on a driven member with which the same is to be associated.

It will be apparent that other equivalent arrangements coming within the scope of my invention may be provided, the above disclosure being by way of example rather than by way of limitation.

I claim:

1. In a centrifugally operable clutch assembly including a driving member; an axially movable pressure plate; a friction disk engageable in driven relation between said driving member and said pressure plate; centrifugally responsive means for moving said pressure plate into engagement with said driven disk; a reaction member for said centrifugally responsive means; retractor spring means for urging said pressure plate toward said reaction member; a plurality of tabs interposed between said reaction member and said driving member; stud means corresponding in number to said tabs and carried thereby, said stud means projecting rearward through said reaction member for guiding said member; spring means acting between said stud means and said reaction member for urging said reaction member toward said driving member; and means detachably assembling said tabs on said driving member.

2. In a centrifugally operable clutch assembly including a driving member; an axially movable pressure plate; a friction disk engageable in driven relation between said driving member and said pressure plate; centrifugally responsive means for moving said pressure plate into engagement with said driven disk; a reaction member for said centrifugally responsive means; retractor spring means for urging said pressure plate toward said reaction member; a plurality of tabs interposed between said reaction member and said driving member; a stud carried by each tab and projecting rearward therefrom through said reaction member for guiding said member, each stud having an abutment beyond said reaction member; a coil compression spring encompassing each stud between said abutment and said reaction member for urging said reaction member toward said driving member; and means detachably assembling said tabs on said driving member.

3. In a centrifugally operable friciton clutch including a driving plate, an axially adjustable pressure plate and a friction disc interposed between said driving plate and said pressure plate for driving engagement, the combination therewith of a main reaction spring carrier in the form of a pressed sheet metal annular ring having a radially extending wall portion, main compression springs received in circumferentially spaced relation about the radial extremity of said carrier wall, the inner terminals of said springs being in engagement with said wall, passages formed in said wall within the confines of said springs, guide pins passing freely through the said openings for guided relation with reference thereto, means fastening the inner terminals of said guide pins to said driving plate, the outer terminals of said guide pins including means engaging the other terminals of said coil compression springs for urging said carrier ring in the direction of said driving plate, a plurality of centrifugally responsive assemblies symmetrically dispose dabout the periphery of said carrier ring effective to operate said carrier and pressure plate for moving the latter into friction driving relation with said friction disc, said centrifugally responsive assemblies each including means on said pressure plate defining a fulcrum, openings formed in said carrier ring in opposed relation to said fulcrums, said openings each being flanked by pressed arcuate slots formed in said carrier ring radial wall, a lever extending through each of said openings and including an intermediate portion engageable with said fulcrum, a weighted member carried at the work applying terminal of said lever, a compression link pivotally engaged at one end thereof by the work performing terminal of said lever, the other end of said link engaging said flanking slotted portions of said carrier wall whereby rotation is effective to move said weights radially outwardly placing said links in compression, the shifting of said fulcrum axially moving said pressure plate into engagement with said friction disc and shifting said ring carrier axially in the opposite direction to compress said coil compression springs.

4. In a centrifugally operable friction clutch including a driving plate, an operably adjustable pressure plate and a friction disc interposed between said driving plate and said pressure plate for the driving engagement, the combination therewith of a main operating spring carrier, said carrier being in the form of a pressed sheet metal annular ring having a radially extending wall portion, main compression springs received in symmetrical circumferentially spaced relation about the radial extremity of said carrier wall, upset openings formed in said wall corresponding to said springs, said openings being countersunk to provide a raised portion embraced by the inner terminals of said springs, guide pins passing freely through said openings for guided relation with reference thereto, a plurality of pressed sheet metal tabs corresponding in number to said springs, means fastening said tabs to said driving member, upset openings formed in said tabs arranged for complementary reception in the upset openings of said ring carrier, said guide pins being formed with radial terminal flanges received between said flywheel and the surrounding wall of said upset openings in said tabs for confinement therein, the outer terminals of said guide pins being provided with means engaging the outer terminals of said coil compression springs for causing said springs to urge said carrier ring in direction of said driving plate, a plurality of centrifugally responsive assemblies, circumferentially disposed about the periphery of said carrier ring effective to operate said carrier and pressure plate for moving the latter into friction driving relation with said friction disc and the former in the direction to compress said compression springs, said centrifugally responsive assemblies each including means on said pressure plate defining a fulcrum portion, openings formed in said carrier ring in opposed relation to said fulcrums, said openings each being flanked by pressed arcuate slots in the wall of said carrier ring, a lever extending through each of said openings and including an intermediate fulcrum engaging portion, and a weighted member carried at the work applying terminal of said lever, a compression link pivotally engaged at one end thereof by the work performing terminal of said lever, the other end of said link engaging said flanking slotted portions of said carrier wall whereby rotation of said clutch assembly is effective to move said weights radially outwardly placing said links in compression, the shifting of said fulcrum axially being effective to move said pressure plate into engagement with said friction disc and shifting said ring carrier axially in opposite direction to compress said coil compression springs.

5. A centrifugally operable clutch assembly which is adapted to operate without a cover whereby to reduce axial dimensions of the assembly, comprising driving and driven members; centrifugal means for frictionally engaging said members; a spring loaded reaction member coacting with said centrifugal means; a plurality of tabs interposed between said reaction member and said driving member, said tabs having axially projecting means extending rearwardly through said reaction member for guiding said member; springs acting between said axially projecting tab means and said reaction member for urging said reaction member in a direction toward said driving member; and means detachably securing said tabs and attaching means provide the sole assembly being so constructed and arranged that said tabs and attaching means provide the sole means for mounting the clutch assembly on said driving member and for connecting said reaction member to said driving member, thereby eliminating a clutch cover.

HAROLD V. REED.

Certificate of Correction

January 15, 1946.

Patent No. 2,392,947.

HAROLD V. REED

It is hereby certified that errors appear in the printed specification of the above numbered patent requiring correction as follows: Page 3, second column, line 48, claim 5, after the word "tabs" insert *on said driving member; said clutch assembly being so constructed and arranged that said tabs*; lines 49 and 50, same claim, strike out "assembly being so constructed and arranged that said tabs and attaching means provide the sole"; and that the said Letters Patent should be read with these corrections therein that the same may conform to the record of the case in the Patent Office.

Signed and sealed this 7th day of May, A. D. 1946.

[SEAL]

LESLIE FRAZER,
*First Assistant Commissioner of Patents.*